(12) United States Patent
Hayashi et al.

(10) Patent No.: US 12,404,848 B2
(45) Date of Patent: Sep. 2, 2025

(54) ELECTRIC COMPRESSOR

(71) Applicant: SANDEN CORPORATION, Gunma (JP)

(72) Inventors: Soichiro Hayashi, Gunma (JP); Takayoshi Shinohara, Gunma (JP)

(73) Assignee: SANDEN CORPORATION, Gunma (JP)

( * ) Notice: Subject to any disclaimer, the term of this patent is extended or adjusted under 35 U.S.C. 154(b) by 82 days.

(21) Appl. No.: 18/550,365

(22) PCT Filed: Mar. 22, 2022

(86) PCT No.: PCT/JP2022/013116
§ 371 (c)(1),
(2) Date: Sep. 13, 2023

(87) PCT Pub. No.: WO2022/202802
PCT Pub. Date: Sep. 29, 2022

(65) Prior Publication Data
US 2024/0305156 A1   Sep. 12, 2024

(30) Foreign Application Priority Data
Mar. 23, 2021 (JP) ................................. 2021-048798

(51) Int. Cl.
*F04B 35/04* (2006.01)
*H02K 3/38* (2006.01)
*H02K 3/44* (2006.01)

(52) U.S. Cl.
CPC ............... *F04B 35/04* (2013.01); *H02K 3/38* (2013.01); *H02K 3/44* (2013.01); *F04C 2240/40* (2013.01)

(58) Field of Classification Search
CPC .. F04B 35/04; H02K 3/38; H02K 3/44; F04C 2240/40
See application file for complete search history.

(56) References Cited

U.S. PATENT DOCUMENTS 8,575,816 B2 * 11/2013 Zeinlinger ............. H02K 1/185
                                                                310/260
10,738,780 B2 * 8/2020 Fukasaku ............... H02K 11/33
(Continued)

FOREIGN PATENT DOCUMENTS

EP       2017478 A2 *  1/2009  ............ F04C 23/008
JP    2000-303953 A    10/2000
(Continued)

OTHER PUBLICATIONS

International Search Report dated Jun. 14, 2022 issued in PCT/JP2022/013116.
(Continued)

*Primary Examiner* — Christopher S Bobish
(74) *Attorney, Agent, or Firm* — Rankin, Hill & Clark LLP (57) ABSTRACT

An electric compressor (1) includes an electric motor (5) including a stator core (51), a stator coil (52) formed by winding a conducting wire (60) around the stator core (51), and a rotor (53) attached to a rotating shaft (4), the electric motor (5) being for rotating the rotating shaft (4) via the rotor (53) through energization of the stator coil (52), a compression mechanism (3) that is driven by the rotating shaft (4) to compress a refrigerant, and a housing (2) including an intake port (21*a*) and a discharge port (24*a*), the housing (2) being for housing the rotating shaft (4), the electric motor (5), and the compression mechanism (3), where the refrigerant drawn in by the intake port (21*a*) is compressed by the compression mechanism (3) and discharged from the discharge port (24*a*). The electric compressor (1) includes a protection member (58) for covering a part (61), of the conducting wire (60), that faces the intake port (21*a*).

9 Claims, 6 Drawing Sheets

(56) References Cited

U.S. PATENT DOCUMENTS

| | | |
|---|---|---|
| 2008/0317614 A1 | 12/2008 | Horiba et al. |
| 2013/0064697 A1 | 3/2013 | Fukasaku et al. |
| 2018/0216617 A1* | 8/2018 | Fukasaku ............ F04C 18/0215 |
| 2020/0232459 A1 | 7/2020 | Yim et al. |

FOREIGN PATENT DOCUMENTS

| | | |
|---|---|---|
| JP | 2008-151050 A | 7/2008 |
| JP | 2008-301688 A | 12/2008 |
| JP | 2009-191761 A | 8/2009 |
| JP | 2013-060822 A | 4/2013 |
| JP | 2016-200122 A | 12/2016 |
| JP | 2018-119528 A | 8/2018 |
| JP | 2020-051328 A | 4/2020 |

OTHER PUBLICATIONS

Japanese Patent Office Action dated May 20, 2025 issued in corresponding Application No. 2021-048798, with machine-generated English translation; 10 pages.

* cited by examiner

ELECTRIC COMPRESSOR

TECHNICAL FIELD

The present invention relates to an electric compressor that includes a compression mechanism for compressing a refrigerant and an electric motor that are housed inside a housing.

BACKGROUND ART

An example of conventional electric compressors is described in Patent Document 1. An electric compressor described in Patent Document 1 includes an electric motor for rotating a rotating shaft, a compression mechanism that is driven by the rotating shaft to compress a refrigerant, and a housing that includes an intake port and a discharge port and that houses the rotating shaft, the electric motor, and the compression mechanism, where a refrigerant that is drawn in by the intake port is compressed by the compression mechanism and is discharged from the discharge port. An example of the electric motor described above includes a stator core, a stator coil formed by a conducting wire wound around the stator core, and a rotor attached to the rotating shaft.

REFERENCE DOCUMENT LIST

Patent Document

Patent Document 1: JP 2020-051328 A

SUMMARY OF THE INVENTION

Problem to be Solved by the Invention

A fluid such as a refrigerant or a lubricating oil that is drawn in by an intake port includes contaminants (foreign materials) that is generated by metal pieces sliding against each other, for example. In relation to the electric compressor described above, in the case in which a part of the conducting wire described above faces the intake port, the contamination described above may collide with the conducting wire, possibly causing the conducting wire to be scratched.

Accordingly, the present invention is aimed at preventing contamination included in a fluid that is drawn in from an intake port from directly colliding with a conducting wire.

Means for Solving the Problem

According to an aspect of the present invention, there is provided an electric compressor. The electric compressor includes: an electric motor including a stator core, a stator coil formed by winding a conducting wire around the stator core, and a rotor attached to a rotating shaft, the electric motor being for rotating the rotating shaft via the rotor through energization of the stator coil; a compression mechanism that is driven by the rotating shaft to compress a refrigerant; a housing including an intake port and a discharge port, the housing being for housing the rotating shaft, the electric motor, and the compression mechanism, where the electric compressor is configured such that the refrigerant drawn in through the intake port is compressed by the compression mechanism and discharged from the discharge port. The electric compressor includes a protection member for covering a part, of the conducting wire, that faces the intake port.

Effects of the Invention

According to the present invention, the part, of the conducting wire, that faces the intake port is covered by a protection member. Accordingly, contamination included in a fluid drawn in by the intake port is prevented by the protection member from colliding with the conducting wire. Therefore, the contamination is prevented from directly colliding with the conducting wire.

MODE FOR CARRYING OUT THE INVENTION

Hereinafter, embodiments of the present invention will be described with reference to the appended drawings.

Figure 1:
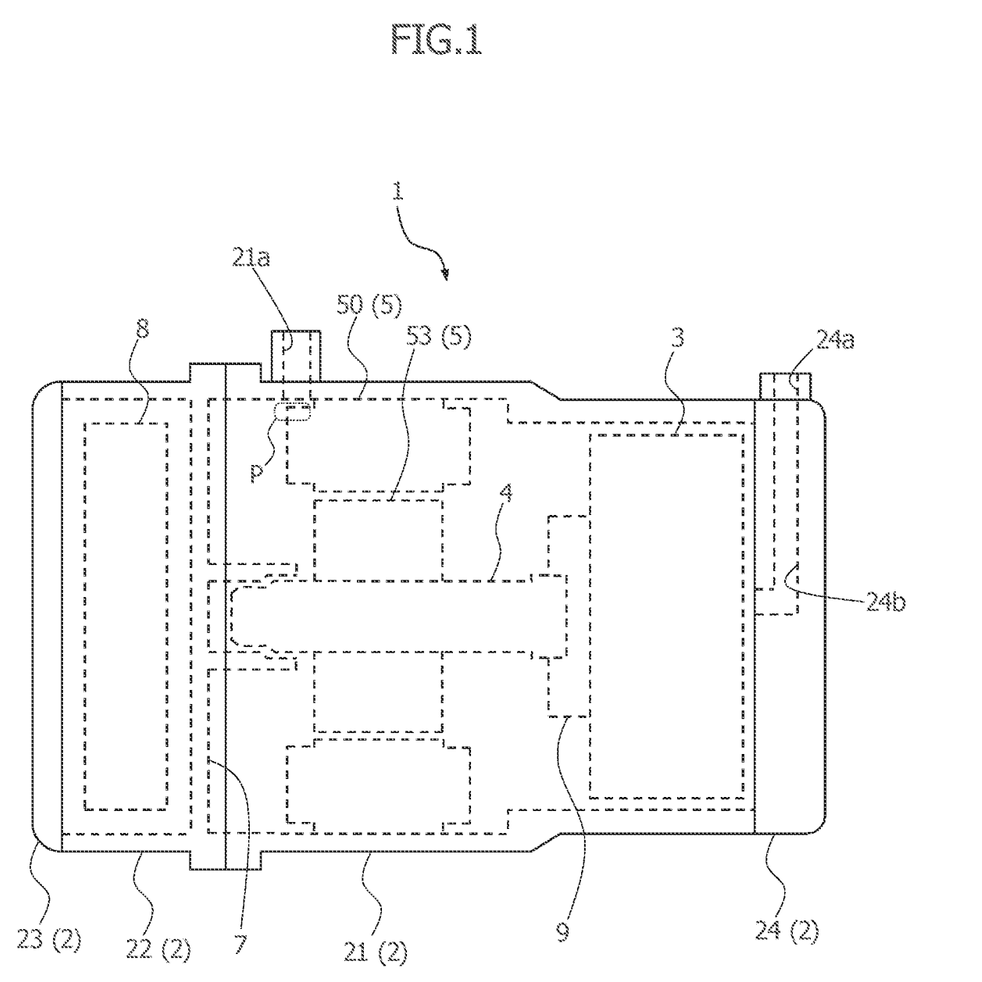
FIG. 1 is a diagram showing an electric compressor according to a first embodiment of the present invention.

FIG. 1 is a diagram showing an electric compressor 1 according to a first embodiment of the present invention. The electric compressor 1 is a horizontal inverter-integrated electric compressor in which a compression mechanism 3 and an electric motor 5 are serially disposed in a horizontal direction inside a housing 2, and in which an inverter 8 as a motor drive circuit is integrally provided. The electric compressor 1 is used in an air conditioner for a vehicle, for example, and forms a refrigeration cycle device by being integrated, together with a condenser, a pressure reducer (for example, an expansion valve), and an evaporator, into a refrigerant circulation channel for circulating a refrigerant. Additionally, in the present embodiment, a refrigerating machine oil (a lubricating oil) circulates through the refrigerant circulation channel, together with the refrigerant.

As shown in FIG. 1, the housing 2 of the electric compressor 1 includes a main housing 21, an inverter housing 22, an inverter cover 23, and a discharge housing 24. The main housing 21, the inverter housing 22, the inverter cover 23, and the discharge housing 24 are formed of a metal material, for example.

The main housing 21 is formed into a cylindrical shape. An intake port 21a for drawing the refrigerant from the evaporator side is formed on a peripheral wall of the main housing 21, on one end side (a left side in FIG. 1). In the present embodiment, the intake port 21a is provided at an upper part of the main housing 21, and is open at a top. The compression mechanism 3, a rotating shaft 4, and the electric motor 5 are housed inside the main housing 21.

An opening of the main housing 21 on the one end side is blocked by the inverter housing 22. The inverter housing 22 is fastened to the main housing 21 by a bolt (not shown). The inverter housing 22 is formed into a bottomed cylindrical shape, and a bottom wall portion thereof forms a partition wall 7 that separates an inside of the main housing 21 from an inside of the inverter housing 22.

The inverter 8 as a motor drive circuit is housed inside the inverter housing 22. An opening of the inverter housing 22 opposite the bottom wall portion is blocked by the inverter cover 23. The inverter cover 23 is fastened to the inverter housing 22 by a bolt (not shown).

An opening of the main housing 21 on another end side is blocked by the discharge housing 24. The discharge housing 24 is fastened to the main housing 21 by a bolt (not shown). In the discharge housing 24, a discharge port 24a for discharging the refrigerant to the condenser side, and a discharge channel 24b for guiding the refrigerant to the discharge port 24a are formed. In the present embodiment, the discharge port 24a is provided at an upper part of the discharge housing 24, and is open at a top.

The compression mechanism 3 is disposed inside the main housing 21, on the discharge housing 24 side. The compression mechanism 3 is driven by rotation of the rotating shaft 4, and takes in and compresses the refrigerant that is drawn into the main housing 21 by the intake port 21a and discharges the compressed refrigerant. The refrigerant that is discharged from the compression mechanism 3 is guided to the discharge port 24a by the discharge channel 24b, and is discharged from the discharge port 24a. Although it is not so limited, a scroll compression mechanism including a fixed scroll and a movable scroll may be adopted as the compression mechanism 3, for example.

The rotating shaft 4 extends in an axial direction of the main housing 21. The rotating shaft 4 is rotatably supported by a bearing, not shown, inside the main housing 21 in a state in which one end of the rotating shaft 4 is coupled to the compression mechanism 3 by a coupling portion 9.

Additionally, in the case in which the compression mechanism 3 is the scroll compression mechanism, the coupling portion 9 may be a crank mechanism for converting a rotating motion of the rotating shaft 4 into an orbiting motion of the movable scroll. The scroll compression mechanism as the compression mechanism 3 takes in and compresses the refrigerant and discharges the compressed refrigerant by the orbiting motion of the movable scroll relative to the fixed scroll caused by rotation of the rotating shaft 4.

The electric motor 5 is disposed inside the main housing 21, on the inverter housing 22 side. That is, the electric motor 5 is disposed inside the main housing 21, at a position closer to the intake port 21a than the compression mechanism 3. The electric motor 5 causes the rotating shaft 4 to rotate. In other words, the electric motor 5 drives the compression mechanism 3 via the rotating shaft 4.

Figure 2A:
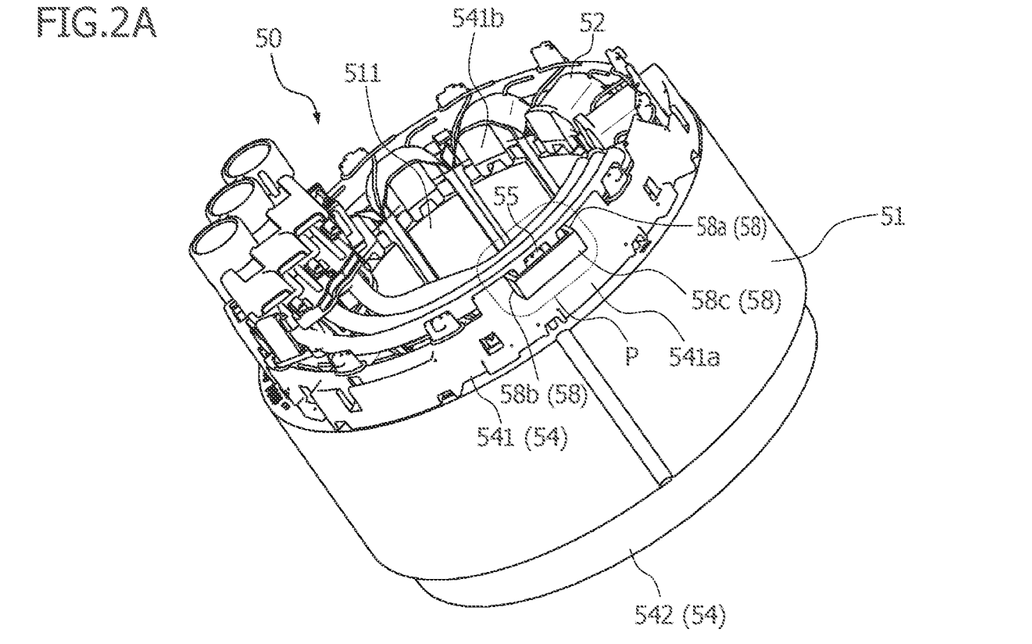
FIG. 2A is a perspective view of a stator according to the first embodiment.
Figure 2B:
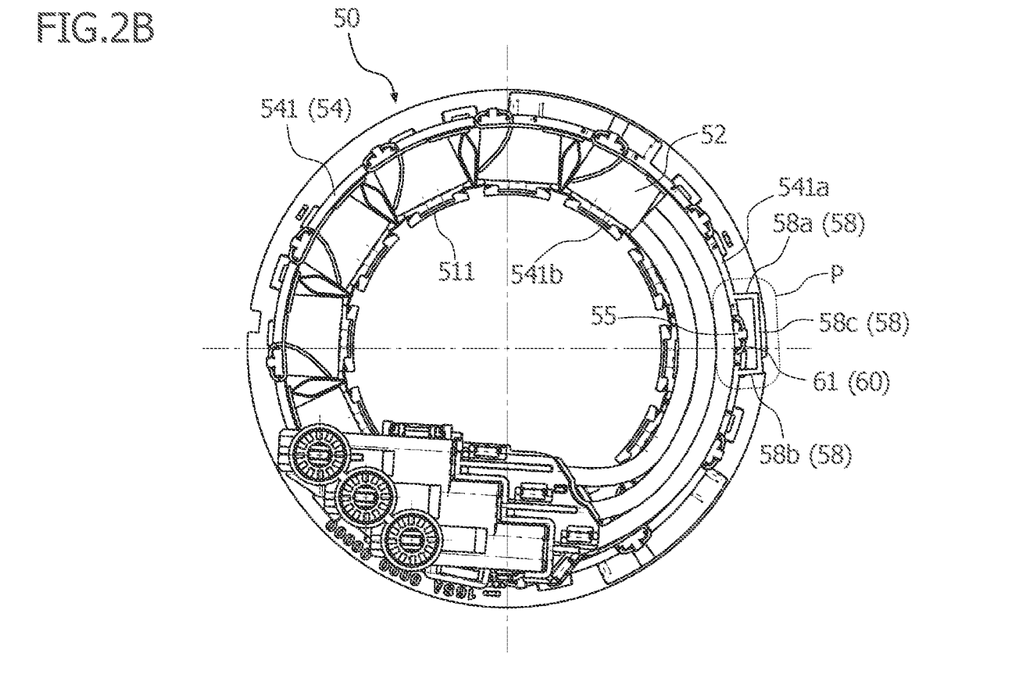
FIG. 2B is a front view of the stator according to the first embodiment.

FIGS. 2A and 2B are a perspective view and a front view of a stator 50 constituting the electric motor 5. As shown in FIGS. 1, 2A, and 2B, the electric motor 5 includes the stator 50 including a stator core 51 and stator coils 52, and a rotor 53.

The stator core 51 is a magnetic body, and is formed into a cylindrical shape. The stator core 51 is supported by an inner wall of the main housing 21. The stator core 51 includes a plurality of (in this case, 12) teeth 511 that protrude radially inward (toward the rotating shaft 4). The plurality of teeth 511 are disposed at regular intervals in a circumferential direction.

The stator coils 52 are formed by concentrated winding of the conducting wire 60 around the stator core 51. More specifically, the stator coils 52 are formed by the conducting wire 60 being wound around each of the plurality of teeth 511 of the stator core 51. Additionally, for example, the conducting wire 60 is a linear conductor (a core wire) on which insulation coating is formed. In other words, the conducting wire 60 is a winding of the stator 50.

The stator 50 further includes an insulator 54 for electrically insulating the stator core 51 and the stator coil 52. The insulator 54 is formed of a resin material having an insulating property. In the present embodiment, the insulator 54 is divided into two insulator members 541, 542.

Figure 3A:
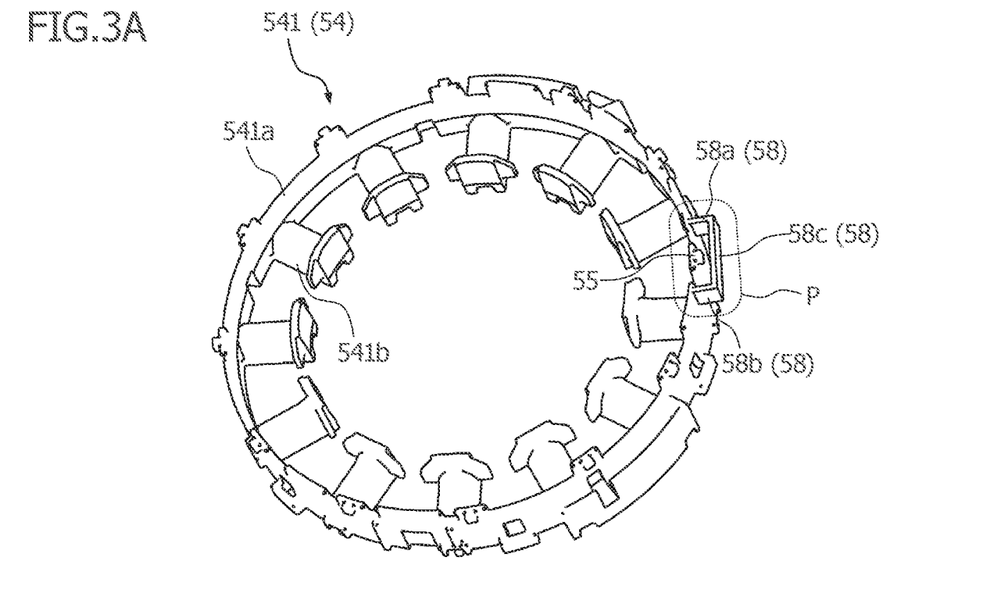
FIG. 3A is a perspective view of an insulator member according to the first embodiment.
Figure 3B:
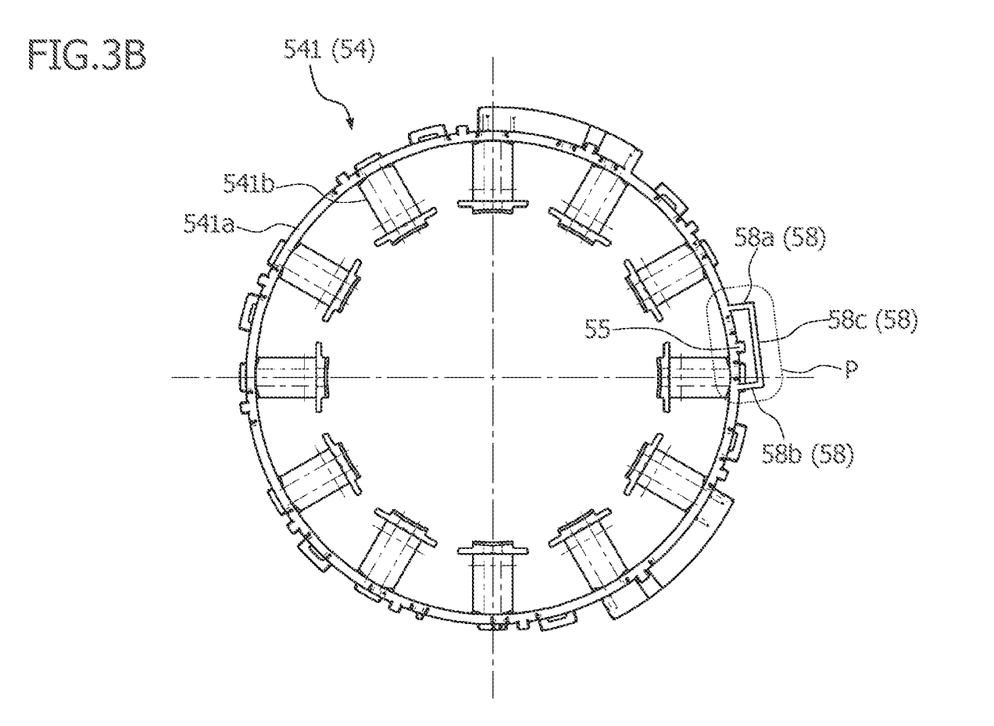
FIG. 3B is a front view of the insulator member according to the first embodiment.
Figure 4:
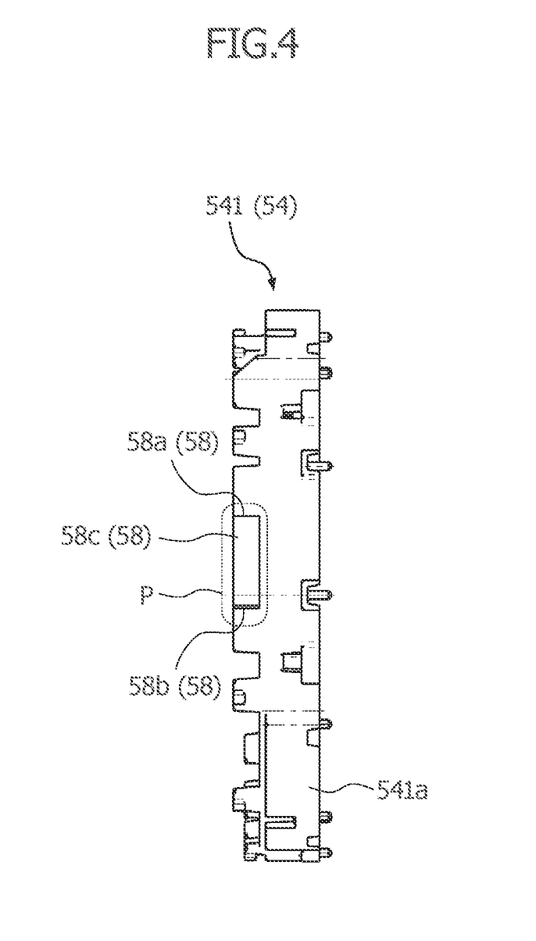
FIG. 4 is a side view of the insulator member according to the first embodiment.

FIGS. 3A and 3B are a perspective view and a front view of the insulator member 541. FIG. 4 is a side view of the insulator member 541.

The insulator member 541 includes an annular base portion 541a, and protruding portion 541b that extends radially inward from the base portion 541a. The protruding portion 541b is interposed between the tooth 511 and the stator coil 52 to insulate the two. A configuration of the insulator member 542 may be the same as that of the insulator member 541.

On an end portion, of the base portion 541a of the insulator member 541, on a side of a coil end of the stator coil 52, a plurality of (in this case, 12) projecting portions 55 are formed at regular intervals in the circumferential direction to hook the conducting wire 60.

A part P shown in FIGS. 1 to 4 faces the intake port 21a.

The rotor 53 is disposed on a radially inward side of the stator core 51 (the plurality of teeth 511). A permanent magnet, not shown, is embedded in the rotor 53. The rotor 53 is formed into a cylindrical shape, and is fixed to the rotating shaft 4 in a state in which the rotating shaft 4 is inserted in a hollow part of the rotor 53. That is, the rotor 53 is attached to the rotating shaft 4 to rotate together with the rotating shaft 4.

The inverter 8 includes various electronic components such as a smoothing capacitor and a power module including a plurality of power switching elements, and a circuit board at which the various electronic components are mounted. The inverter 8 is connected to an external power source (such as a vehicle-mounted battery) via a first power line, not shown, and is connected to the electric motor 5 (the stator coil 52) via a second power line, not shown, that penetrates through the partition wall 7 in an airtight and liquid-tight manner.

When a power supply voltage is applied to the inverter 8 by the external power source, the inverter 8 outputs an alternating current to the stator coils 52 of the electric motor 5. That is, the stator coils 52 are energized. When the stator coils 52 are energized, a rotating magnetic field is generated, and the rotor 53 rotates in synchronization with the rotating magnetic field that is generated. The rotating shaft 4 is thereby rotated to drive the compression mechanism 3. Furthermore, the refrigerant is drawn into the main housing 21 by the intake port 21a.

The refrigerant that is drawn into the main housing 21 by the intake port 21a first passes through the electric motor 5, and then through the compression mechanism 3. That is, the refrigerant that is drawn in by the intake port 21a sequentially passes through the electric motor 5 and the compression mechanism 3. The refrigerant that is drawn in by the intake port 21a cools the electric motor 5 at the time of passing through the electric motor 5, and is compressed by the compression mechanism 3 at the time of passing through the compression mechanism 3, and the compressed refrigerant is discharged from the discharge port 24a.

In the present embodiment, a protection member 58 that covers a part 61, of the conducting wire 60, that faces the intake port 21a is provided at the base portion 541a of the insulator member 541. In particular, in the present embodiment, the protection member 58 is formed integrally with the base portion 541a of the insulator member 541. Additionally, in the present embodiment, the part 61 of the conducting wire 60 is also a part that connects the stator coils 52 that are adjacent to each other in the circumferential direction.

The protection member 58 has a U-shaped or C-shaped wall shape when seen from a front of the insulator member 541. The protection member 58, for example, is formed from a pair of wall portions 58a, 58b that face each other with a space in between, and a wall portion 58c that extends between the wall portions 58a, 58b. The wall portions 58a, 58b each extend radially outward from the base portion 541a of the insulator member 541. The wall portion 58c extends substantially in parallel with the base portion 541a of the insulator member 541.

The wall portion 58c of the protection member 58 faces the intake port 21a. When seen by the intake port 21a, the part 61 of the conducting wire 60 is hidden by the wall portion 58c of the protection member 58. That is, the part 61 of the conducting wire 60 is disposed between the projecting portion 55 of the insulator member 541 and the wall portion 58c of the protection member 58. Furthermore, particularly in the present embodiment, the protection member 58 covers the part 61 of the conducting wire 60 and the projecting portion 55.

Additionally, in the present embodiment, the shape of the protection member 58 is a U-shaped or C-shaped wall shape mentioned above, but the shape of the protection member 58 is not limited thereto. For example, the shape of the protection member 58 may be an arc-shaped wall shape when seen from the front of the insulator member 541.

According to the present embodiment, the electric compressor 1 includes the electric motor 5 including the stator core 51, the stator coil 52 formed by winding the conducting wire 60 around the stator core 51, and the rotor 53 attached to the rotating shaft 4, the electric motor 5 being for rotating the rotating shaft 4 via the rotor 53 through energization of the stator coil 52; the compression mechanism 3 that is driven by the rotating shaft 4 to compress a refrigerant; and the housing 2 including the intake port 21a and the discharge port 24a, the housing 2 being for housing the rotating shaft 4, the electric motor 5, and the compression mechanism 3. The electric compressor 1 is configured such that the refrigerant drawn in by the intake port 21a is compressed by the compression mechanism 3 and is discharged from the discharge port 24a. The electric motor 5 is an inner rotor motor at which the rotor 53 is disposed on a radially inner side of the stator core 51 having a cylindrical shape. The electric compressor 1 includes the protection member 58 for covering the part 61, of the conducting wire 60, that faces the intake port 21a. Accordingly, contaminants included in a fluid drawn in by the intake port 21a is prevented, by the protection member 58, from colliding with the conducting wire 60. Accordingly, the contaminants are prevented from directly colliding with the conducting wire 60.

Furthermore, according to the present embodiment, the electric motor 5 further includes the insulator 54 for insulating the stator core 51 and the stator coil 52. The protection member 58 is provided at the insulator 54. The protection member 58 is preferably integrally formed with the insulator 54. This allows the protection member 58 to be assembled together with the insulator 54.

Furthermore, according to the present embodiment, the part 61 of the conducting wire 60 is disposed between the projecting portion 55 of the insulator 54 and the protection member 58. Accordingly, the part 61 of the conducting wire 60 may be well protected from the contamination included in the fluid drawn in by the intake port 21a.

Furthermore, according to the present embodiment, the protection member 58 has a wall shape. Accordingly, the protection member 58 may be achieved by a simple structure.

Next, a second embodiment of the present invention will be described with reference to FIGS. 5A and 5B.

Figure 5A:
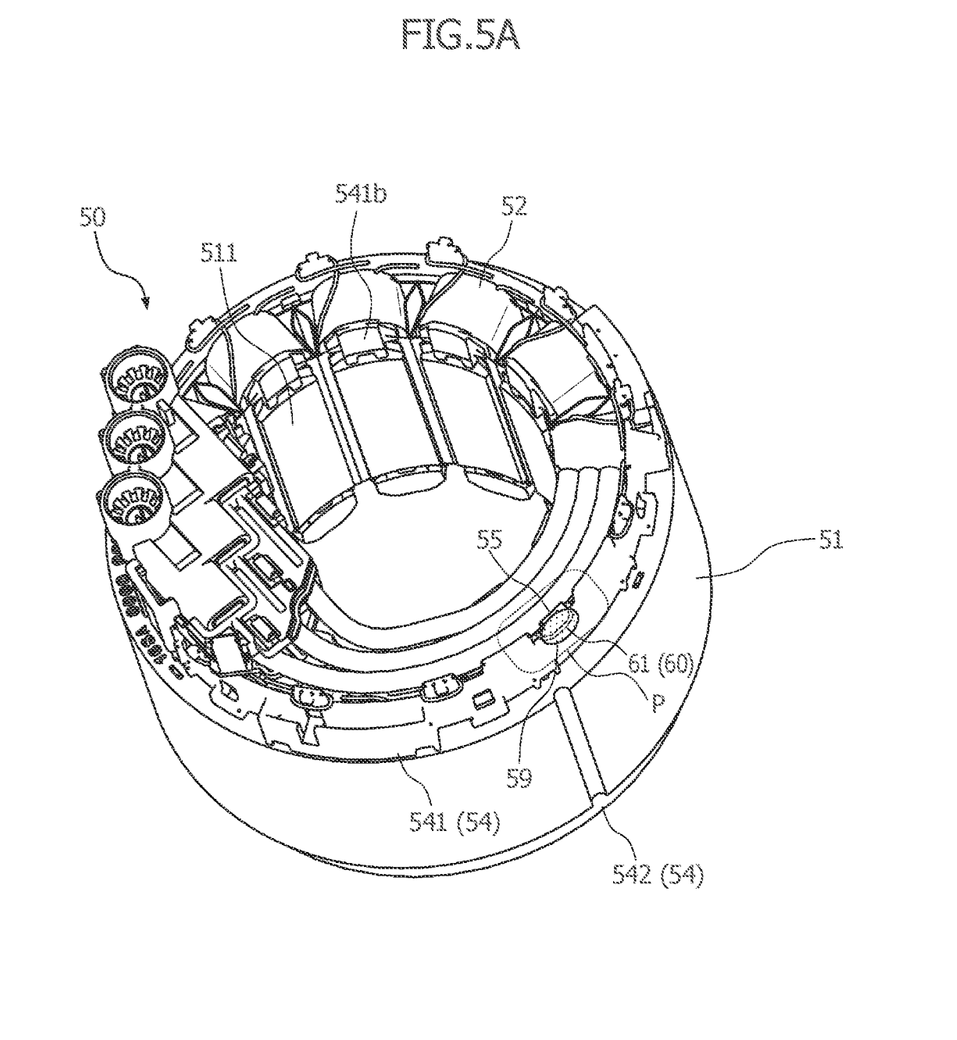
FIG. 5A is a perspective view of a stator according to a second embodiment of the present invention.
Figure 5B:
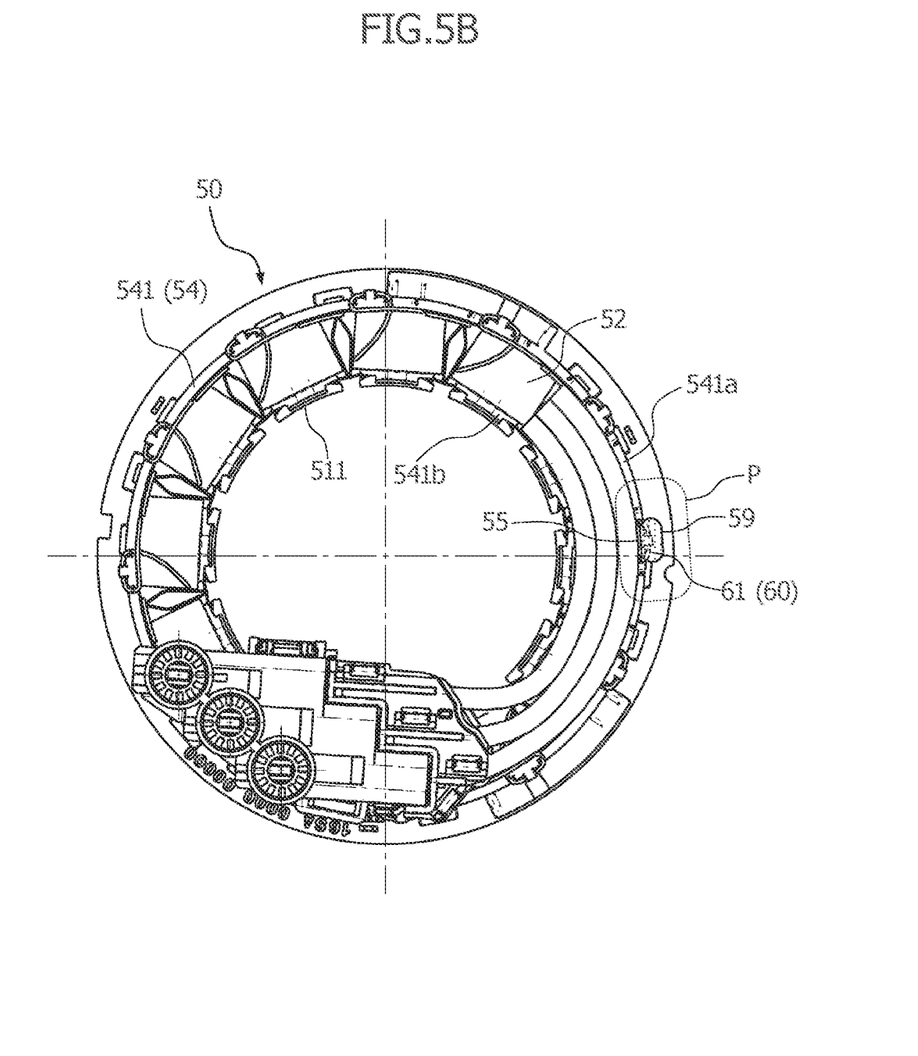
FIG. 5B is a front view of the stator according to the second embodiment of the present invention.

FIGS. 5A and 5B are a perspective view and a front view of the stator 50 according to the present embodiment. Differences from the first embodiment described above will be described.

In the present embodiment, a protection member 59 is provided instead of the protection member 58 described above. The protection member 59 is formed by a molding resin. In other words, the part 61 of the conducting wire 60 is covered by molding (sealing) of the resin, and the molded part functions as the protection member 59. The resin (molding resin) includes a thermosetting resin having an insulating property, and includes an epoxy resin, for example.

The protection member 59 faces the intake port 21a. When seen from the intake port 21a, the part 61 of the conducting wire 60 is hidden by the protection member 59. The part 61 of the conducting wire 60 may be disposed between the projecting portion 55 of the insulator member 541 and the protection member 59. In particular, in the present embodiment, the protection member 59 may cover the part 61 of the conducting wire 60 and the projecting portion 55.

In particular, according to the present embodiment, the protection member 59 is formed by a molding resin that covers the part 61 of the conducting wire 60. Accordingly, the part 61 of the conducting wire 60 may be easily covered by molding the resin, and thus, the part 61 of the conducting wire 60 may be easily protected.

Additionally, in the first and second embodiments, the electric compressor according to the present invention is applied to a horizontal electric compressor at which the compression mechanism and the electric motor are serially disposed in the horizontal direction inside the housing, but it is apparent that the electric compressor according to the present invention may also be applied to a vertical electric compressor at which the compression mechanism and the electric motor are serially disposed in a vertical direction inside the housing.

Heretofore, the embodiments of the present invention have been described, but the present invention is not limited to the embodiments described above, and modifications and changes can, of course, be made based on the technical idea of the present invention.

REFERENCE SYMBOL LIST

1 Electric compressor
2 Housing
3 Compression mechanism
4 Rotating shaft
5 Electric motor
8 Inverter
21a Intake port
24a Discharge port
50 Stator
51 Stator core
52 Stator coil
53 Rotor
54 Insulator 55 Projecting portion
58 Protection member
58a, 58b, 58c Wall portion
59 Protection member
60 Conducting wire
61 Part
511 Tooth
541, 542 Insulator member
541a Base portion
541b Protruding portion

The invention claimed is:

1. An electric compressor comprising:
    an electric motor including a stator core, a stator coil formed by winding a conducting wire around the stator core, a rotor attached to a rotating shaft, and an insulator for insulating the stator core and the stator coil, the electric motor being for rotating the rotating shaft via the rotor through energization of the stator coil;
    a compression mechanism that is driven by the rotating shaft to compress a refrigerant;
    a housing including an intake port and a discharge port, the housing being for housing the rotating shaft, the electric motor, and the compression mechanism, wherein
    the electric compressor is configured such that the refrigerant drawn in by the intake port is compressed by the compression mechanism and is discharged from the discharge port, and
    a protection member for covering a part, of the conducting wire, that faces the intake port is provided,
    the protection member is provided on the insulator,
    the insulator has a projecting portion to hook the conducting wire, and
    the part is disposed between the projecting portion and the protection member.

2. The electric compressor according to claim 1, wherein the electric motor is an inner rotor motor at which the rotor is disposed on a radially inner side of the stator core having a cylindrical shape.

3. The electric compressor according to claim 1, wherein the protection member is formed by a molding resin that covers the part.

4. The electric compressor according to claim 1, wherein the protection member is integrally formed with the insulator.

5. The electric compressor according to claim 1, wherein the protection member has a wall shape.

6. The electric compressor according to claim 1, wherein a void is formed between the part and the protection member.

7. The electric compressor according to claim 1, wherein the insulator is divided into a plurality of insulator members, and wherein the protection member is provided on one of the plurality of insulator members.

8. The electric compressor according to claim 1, wherein contaminants included in the refrigerant drawn in by the intake port are prevented, by the protection member, from colliding with the conducting wire.

9. The electric compressor according to claim 1, wherein
    the insulator further includes an annular base portion defining a center axis direction, and
    the projecting portion extends along the center axis direction from the annular base portion.

* * * * *